W. F. WORTMAN.
NUT LOCK.
APPLICATION FILED NOV. 8, 1920.
1,381,610.
Patented June 14, 1921.
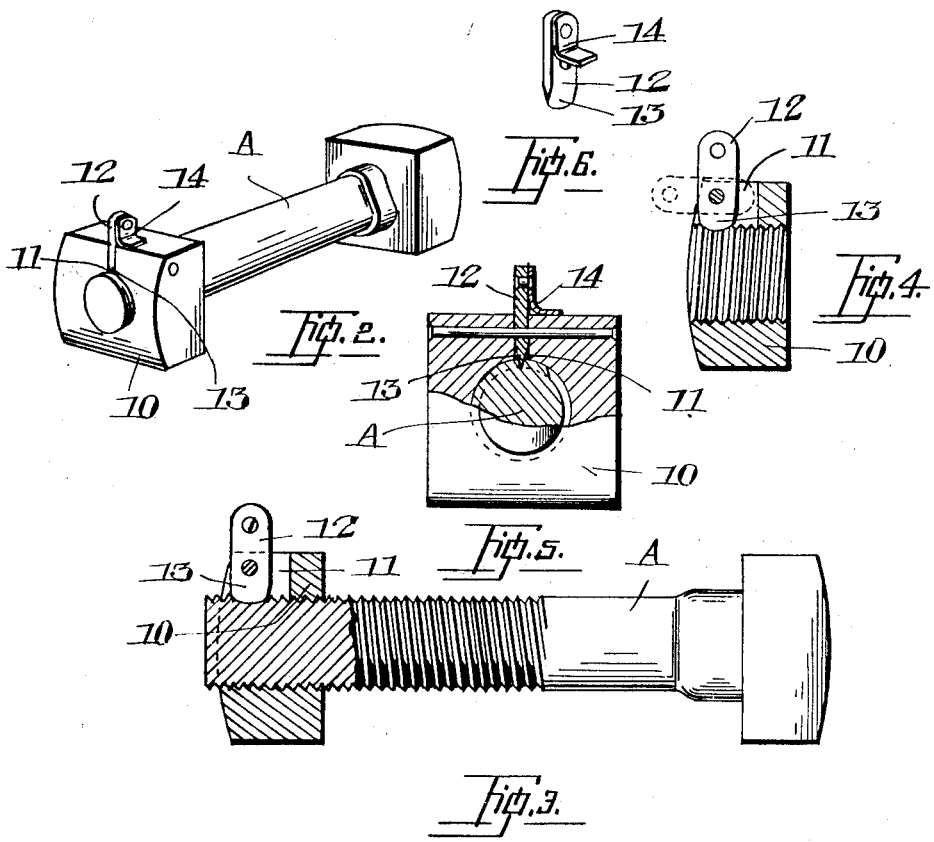
INVENTOR
WILLIAM F. WORTMAN.
BY *Fitkustrahau* ATTYS.

UNITED STATES PATENT OFFICE.

WILLIAM FLETCHER WORTMAN, OF SALISBURY, NEW BRUNSWICK, CANADA.

NUT-LOCK.

1,381,610.  Specification of Letters Patent.  Patented June 14, 1921.

Application filed November 8, 1920. Serial No. 422,620.

*To all whom it may concern:*

Be it known that I, WILLIAM FLETCHER WORTMAN, a subject of the King of Great Britain, and resident of the village of Salisbury, county of Westmoreland, Province of New Brunswick, Dominion of Canada, have invented certain new and useful Improvements in Nut-Locks, of which the following is a specification.

This invention relates to improvements in nut locks, and the objects of the invention are to facilitate locking a nut in position after it has been tightened on a bolt, to prevent the locking means slipping or becoming inadvertently undone so that to loosen the locking means it is necessary to apply manual force to the locking means to actuate the same and generally to simplify the construction of the nut to better perform the functions required of it.

The invention consists essentially of the improved construction particularly described and set forth in the following specification and accompanying drawings forming part of the same.

In the drawings:

Figure 1 is a perspective view of a bolt provided with a nut embodying my invention and as seen when unlocked.

Fig. 2 is a perspective view of the bolt showing the locking means in locked position.

Fig. 3 is a side elevation partly sectional of the bolt showing the nut in section, and means whereby the locking member engages the bolt.

Fig. 4 is a vertical section through the nut and showing the locking means mounted thereon.

Fig. 5 is an end view of the nut and bolt, part being in section and showing the locking means engaging with the bolt.

Fig. 6 is a perspective view of the locking means.

Like characters of reference refer to like parts in the several figures.

Referring to the drawings; A represents a bolt of any usual description provided with a nut 10 which is provided on the outer face with a radial slot 11 which only extends partially of the depth of the nut.

Pivotally mounted on this slot 11 is a locking member 12, the inner end of which is beveled to form a cutting edge 13.

This locking member 12 carries on its outer end a spring 14 which is substantially angle-shaped, one arm of the spring lying along the face of the locking member 12, and the other arm being designed to engage with one of the faces of the nut 10.

When the nut is being tightened the locking member 12 is in the position shown in Fig. 1 in which the edge 13 is out of contact with the threads of the bolt A and, when the nut 10 has been tightened to the desired position, the locking member 12 is rotated about its pivotal point into the position shown in Fig. 2, in which the edge 13 bites into the thread of the bolt A and prevents the nut 10 being loosened.

The locking member 12 is held in adjusted position by the spring 14 and cannot work loose from the bolt A no matter what jarring or vibratory motion may be applied to the bolt.

A bolt provided with a locking nut of this nature could be advantageously utilized on the moving parts of engines and fish plate of rail joints, etc.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

A locking nut comprising a nut having a radial slot extending partially of the depth thereof, a locking member pivotally mounted in the slot and having an inner cutting edge, and an angle shaped spring secured to the outer end of the locking member, as and for the purpose specified.

In witness whereof I have hereunto set my hand in the presence of two witnesses.

WILLIAM FLETCHER WORTMAN.

Witnesses:
 TUTTLE T. GOODWIN,
 BEATRICE CRAWFORD.